United States Patent Office 3,701,812
Patented Oct. 31, 1972

3,701,812
PROCESS FOR PREPARATION OF
TRICYCLOPENTADIENE
Herbert J. Gebhart, Jr., Ferguson, and Earle C. Makin, Jr., St. Louis, Mo., assignors to Monsanto Company, St. Louis, Mo.
No Drawing. Filed Oct. 5, 1970, Ser. No. 78,252
Int. Cl. C07c *13/28*
U.S. Cl. 260—666 PY    12 Claims

ABSTRACT OF THE DISCLOSURE

A process for preparing tricyclopentadiene from a feed stream containing dicyclopentadiene comprising heating the stream at a temperature of from 260 to 310° C. for a period of from 5 to 25 minutes and under a pressure sufficient to maintain cyclopentadiene essentially in solution. The process produces tricyclopentadiene in yields generally above 70 percent and substantially excludes production of cyclopentadiene polymers higher than the trimer.

BACKGROUND OF THE INVENTION

Perhydrocyclopentadiene trimer or tricyclopentadiene stabilized by hydrogenation has been found to be an effective tractive fluid by Hammann and Schisla as disclosed in their U.S. Pat. 3,411,369. However, previous methods of preparing the cyclopentadiene trimer, a necessary starting material for the hydrogenated trimer, have been cumbersome and generally unattractive. One of the difficulties of such previous methods is the thermal instability of the trimer which has made isolation of the trimer from other oligomers, including the dimer, extremely difficult. Another frequent problem associated with preparation of the trimer is that at the generally higher temperatures required for its preparation still higher polymers of cyclopentadiene such as the tetramer, pentamer and the like are also formed in significant quantities and these higher polymers are very difficult to separate from the desired trimer without reforming the dimer and monomer thereof to the detriment of yields of the trimer.

Previously the most desired homopolymer of cyclopentadiene has been the dimer and several processes for the dimerization of cyclopentadiene have been proposed. Most of these processes rely on relatively low temperatures to minimize the formation of the higher polymers such as the trimer, tetramer, pentamer and the like. Some processes for the production of the dimer of cyclopentadiene have utilized a two-step procedure at different temperatures and for different periods of time in attempts to minimize production of polymers higher than the dimer. It has been generally accepted that higher temperatures and longer contact times favored the production of the undesired higher polymers.

SUMMARY OF THE INVENTION

It is an object of the present invention to provide a process for the preparation of tricyclopentadiene in high yields. It is also an object of the present invention to provide a continuous process for the preparation of tricyclopentadiene. It is further object of the present invention to provide a process for the preparation of tricyclopentadiene in which co-production of polymers higher than the trimer is substantially excluded. A still further object is to provide such a process which can utilize as the initial feed a dicyclopentadiene concentrate stream as recovered from a $C_5$ hydrocarbon separation and purification process.

These and other objects are accomplished by the present invention which is a process for the preparation of tricyclopentadiene comprising passing to a trimerization zone a stream of dicyclopentadiene and an organic solvent therefor and heating said stream in said zone at a temperature of from 260 to 310° C. for a period of from 5 to 25 minutes and under a pressure such that any cyclopentadiene monomer present is maintained in solution, and separating the resulting tricyclopentadiene from the effluent from the trimerization zone. Under these conditions, it has been found that at least 50 percent and generally more than 70 percent of the dicyclopentadiene present has been trimerized. If the trimerization process is conducted under these conditions it has been found that such high yields of tricyclopentadiene are obtained and that production of polymers higher than the trimer is substantially prevented.

DESCRIPTION OF THE PREFERRED EMBODIMENTS

The present invention is applicable to the production of tricyclopentadiene from feed streams containing cyclopentadiene or dicyclopentadiene and mixtures thereof. Even when starting with a relatively pure concentrated dicyclopentadiene there is present a certain amount of monomeric cyclopentadiene by virtue of the slow reforming of the monomer from the dimer under even room temperature conditions. Any feed stream containing at least 20 percent by weight of cyclopentadiene or dicyclopentadiene can be used to produce the trimer, but the more concentrated the dicyclopentadiene the higher are the yields of trimer which can be produced under the conditions of the present process. It is not necessary that a highly purified dicyclopentadiene feed be employed in order to obtain high yields of the trimer. A very suitable source of a dicyclopentadiene feed stream is the dicyclopentadiene concentrate stream from a $C_5$ hydrocarbon separation process which separates such a concentrate along with other streams comprising $C_5$ hydrocarbons, such as isoprene and piperylene concentrates. Such a dicyclopentadiene concentrate stream will generally contain a minor amount of $C_6$ and higher hydrocarbons separated along with the dimerized cyclopentadiene. A typical analysis of such a dicyclopentadiene concentrate stream is set forth below:

| | Wt. percent |
|---|---|
| $C_5$ hydrocarbon | 11.35 |
| Benzene | 1.20 |
| Dicyclopentadiene | 66.50 |
| Methyldicyclopentadiene | 0.45 |
| Other codimers ($C_9$-$C_{11}$) | 20.50 |
| Total contained cyclopentadiene | 76.75 |

In order to dissipate the heat generated by the trimerization reaction and to prevent plugging of the trimerization reactor it has been found advantageous to utilize as the feed a mixture of the dicyclopentadiene stream and a hydrocarbon solvent for the dicyclopentadiene and the monomeric cyclopentadiene. Suitable solvents are any aromatic or aliphatic hydrocarbon which is a solvent for dicyclopentadiene and includes such aliphatic hydrocarbons as n-heptane, n-octane, n-decane, undecane, dodecane, cyclohexane, methyl cyclohexane, Tetralin and aromatic hydrocarbons such as benzene, toluene or xylene. The aromatic hydrocarbons are preferred and benzene is particularly preferred because they are also excellent solvents for the tricyclopentaiene products and thus prevent any deposition of such trimer in the reactor or its associated lines. filters and control valves.

The conditions of time, temperature and pressure under which the heat treatment is conducted are critical to the realization of good yields of tricyclopentadiene and to minimize the coproduction of polymers of cyclopentadiene higher than the trimer. Thus, temperatures higher than 310° C. in the trimerization zone have been found to result in production of substantial amounts of tetramer and/or pentamer while temperatures below 260° C. will not result in the trimerization of a majority of the dicyclopentadiene present in the feed. It is preferred to conduct the trimerization at temperatures of from about 270 to 300° C. The residence time in the trimerization zone is from 5 to 25 minutes, and preferably such residence time is from about 10 to about 20 minutes. The pressure which is maintained in the process is any pressure that will be effective to maintain cyclopentadiene monomer essentially in solution at the temperature of the trimerization zone. In practice it has been found that a pressure of from 470 to 550 p.s.i.g. depending on the trimerization zone temperature is satisfactory, while pressures of from about 490 to 530 p.s.i.g. are preferred.

Any appropriate apparatus may be used to conduct the trimerization reaction so long as such apparatus is constructed to provide an effective residence time of from 5 to 25 minutes for the feed stream flowing therethrough. For example, the trimerization reactor can take the form of a straight through tubular reactor heated so as to maintain the required temperature therein. Likewise, it can comprise a heated coiled tubular reactor. Such reactor can also comprise a column, either packed or unpacked, adapted to maintain the required heat and provide for the above residence time. Other suitable types of reaction apparatus can be employed and will readily occur to those skilled in the art.

The dicyclopentadiene within the trimerization zone is trimerized to the extent of at least 50 percent and preferably at least 70 percent of the dicyclopentadiene present in the feed stream. However, almost no polymers of cyclopentadiene heavier than the trimer are produced. Thus, plugging of the trimerization reactor and associated lines, filters, valves and the like is avoided and high yields of the desired trimer produced.

The tricyclopentadiene can be separated from the effluent from the trimerization zone by any suitable means. Commonly the trimer product is separated from the other products of the reaction and the solvent present by a flash distillation procedure conducted in a relatively low pressure stripping column. Alternatively, if one of the aliphatic hydrocarbon solvents is employed in the feed stream, then a procedure involving a simple cooling and precipitation of the trimer with recycle of the liquid fraction to the feed stream can be used. For some uses of the trimer product a separation is not necessary before further treatment of the product. For example, if it is desired to convert the trimer into the perhydrocyclopentadiene trimer, then the effluent from the trimerization zone may be subjected to hydrogenation conditions over a hydrogenation catalyst and the perhydrocyclopentadiene trimer produced separated by a subsequent distillation. In this procedure the solvent hydrocarbon recovered from the distillation would again be suitable for recycle to the feed stream of the present process.

The following examples are presented by way of illustration. However, such examples are not to be construed as limiting of the present invention. In the examples set out below, the analyses reported were determined by analyzing samples by means of an F and M 720 gas-liquid chromatograph using a column 12 feet by ¼ inch of an absorbent composed of a methyl and phenyl substituted silicone resin (SE-52 of General Electric Company) on a fluxed, calcined diatomite support (Chromosorb W) and employing as a standard appropriate response factors for the solvent employed, cyclopentadiene, dicyclopentadiene and tricyclopentadiene.

EXAMPLE I

The reaction conditions necessary for the production of tricyclopentadiene to the substantial exclusion of polymers higher than the trimer were established by a series of batch runs as set out below. There were reacted a solution of dicyclopentadiene in benzene solvent at a 1:1 weight ratio at various reaction temperatures and times in sealed glass capillary tubes introduced into a brass heating block heated to controlled temperatures. The solution charged in each instance comprised 48.9 weight percent dicyclopentadiene and 51.1 weight percent benzene. The reacted samples were then analyzed by gas-liquid chromatography as outlined above and the results are set out in Table I below. Due to the unavailability of response factor standards for the higher polymers such as the tetramer and pentamer of cyclopentadiene they were estimated for the closed system by use of benzene as an internal standard since the weight of benzene, dicyclopentadiene and its products must necessarily be constant, each being equal to its weight percent in the starting solution.

TABLE I

| Temp., °C. | Reaction time, min. | Monomer | Benzene [1] | Dimer | Trimer |
|---|---|---|---|---|---|
| 200 | 5 | 5.25 | 47.89 | 46.86 | Trace |
|     | 25 | 5.35 | 49.80 | 43.04 | 1.81 |
| 250 | 5 | 8.52 | 47.57 | 38.92 | 4.99 |
|     | 10 | 7.46 | 49.99 | 35.32 | 7.23 |
| 275 | 5 | 7.21 | 45.04 | 21.05 | 26.70 |
|     | 10 | 4.54 | 46.44 | 12.49 | 36.53 |
|     | 15 | 2.01 | 47.45 | 13.34 | 37.20 |
| 300 | 5 | 6.94 | 47.26 | 10.36 | 35.44 |
|     | 10 | 5.98 | 48.98 | 7.47 | 37.57 |
|     | 15 | 7.14 | 49.91 | 7.64 | 35.31 |
| 325 | 10 | 7.32 | 72.28 | 7.52 | 12.88 |
|     | 25 | 6.16 | 82.28 | 4.67 | 6.89 |

[1] Average weight percent benzene above dotted line, 48.30.

It will be seen from the above analytical results that the recovered reaction products from the closed system runs contained very low weight percents of cyclopentadieine trimer at temperatures of 250° C. and below. It will also be seen that at a temperature of 325° C. very substantial amounts of polymers higher than the trimer were produced, as indicated by the values for benzene concentration of samples at this temperature of 72 and 82 weight percent with corresponding decreases in the weight percent of trimer produced and unreacted dimer remaining. Thus, it may be seen that at temperatures above about 310° C. and at times of from 5 to 25 minutes substantial production of cyclopentadiene polymers higher than the trimer is encountered, while at temperatures of about 310° C. and below substantially none of such higher polymers are produced.

EXAMPLE II

A continuous preparation of tricyclopentadiene was conducted in a continuous flow reactor employing the indicated preferred conditions as determined in Example I above. The reactor employed consisted of a straight stainless steel jacketed tubular reactor of ½ inch outside diameter and 30 inch heated length having a heated volume of approximately 75 ml. The tubular reactor was surrounded by four 1000 watt Variac-controlled electric heaters spaced approximately at the entry end and each 8 inches therefrom. Only the first and last of such heaters was used to bring the reactor to reaction temperature and the second and third heaters only employed during the run when need to balance the heat load was apparent. The temperatures within the reactor were determined by four thermocouples silver-soldered to the outside of the tubular reactor at approximately 6 inch intervals from the entry end. The continuous reactor was supplied with a metered flow feed tank and feed pump as well as effluent line filters and a flow control valve controlling the rate of effluent to the product receiver. Both the line filters and flow control valve were provided with heating means to prevent the solidification of trimer product therein. The continuous reactor was also provided with a means for maintaining a positive pressure of inert nitrogen gas of up to 1000 p.s.i.g. therein.

A completely successful eight-hour continuous run for the production of tricyclopentadiene was conducted in the above described equipment in which the feed stream comprised 750 grams of dicyclopentadiene and 750 grams of benzene. The conditions maintained throughout the run were a reactor temperature of 275° C., a pressure of 500 p.s.i.g. and a flow rate of 4 ml./min. for an approximate residence time of 15 to 20 minutes. Approximately 1400 grams of reaction product mixture were recovered, analyzed and further treated for recovery of the trimer. The gas-liquid chromatographic analyses of the compositions by weight percent of the feed stream and the reaction product are set out in Table 2 below.

TABLE 2

|  | Feed | Reaction mixture |
|---|---|---|
| Monomer | 6.28 | 2.75 |
| Benzene | 47.85 | 49.26 |
| Dimer | 45.87 | 8.25 |
| Trimer | Trace | 39.74 |

From the above results it can be seen that approximately 86 weight percent of the dicyclopentadiene present has been converted to tricyclopentadiene while of the total dimer and monomer present in the feed stream some 76 weight percent was converted to the trimer. It is also seen that no significant amounts of polymers higher than the trimer were produced during the eight-hour continuous run by a comparison of the benzene concentrations.

The 1400 grams of reaction product of the eight-hour run were recovered as perhydrocyclopentadiene trimer by hydrogenation over a rhodium on carbon hydrogenation catalyst and recovery by distillation in an Oldershaw column of approximately 50 theoretical plates.

EXAMPLE III

Another continuous run was conducted which serves to confirm the criticality of the temperature conditions required. The run was conducted in a modification of the reactor described in Example II which employed a 100 inch coiled stainless steel tubular reactor of ¼ inch outside diameter of roughly the same total reactor volume with essentially the same conditions of temperature, pressure and residence time as in Example II. However, in this instance due to faulty warm-up procedure, one section of the reactor reached a temperature in excess of 350° C. As a result the coil plugged completely after some three hours of operation with the pressure within the reactor rising to 750 p.s.i.g. before the feed stream was shut down. This plugging of the reactor was found to be due to production of insoluble polymers higher than the trimer.

EXAMPLE IV

Additional batch runs conducted in the same manner as set forth in Example I were conducted with other solvents for dicyclopentadiene. In these runs it was established that aliphatic and cycloaliphatic hydrocarbons as exemplified by n-heptane and cyclohexane were suitable as diluents in the reaction and that the reaction kinetics were essentially unaffected by the solvent change. However, it was observed that neither of the aliphatic solvents was as effective as the aromatic hydrocarbons in maintaining the tricyclopentadiene product in solution.

We claim:

1. A process for the preparation of tricyclopentadiene comprising passing a stream comprising dicyclopentadiene and a hydrocarbon solvent therefor higher boiling than cyclopentadiene to a trimerization zone and heating said stream in said zone to a temperature of from 260 to 300° C. for a period from 5 to 25 minutes under a pressure sufficient to maintain cyclopentadiene essentially in solution, and recovering the product from the reaction mixture.

2. The process of claim 1 conducted as a continuous reaction.

3. The process of claim 1 wherein at least 50 percent of the dicyclopentadiene in the said stream is trimerized.

4. The process of claim 1 wherein the temperature of the stream in the trimerization zone is from 270 to 300° C.

5. The process of claim 1 wherein the time of said stream in the trimerization zone is from about 10 to about 20 minutes.

6. The process of claim 1 wherein the pressure in the trimerization zone is from 470 to 550 p.s.i.g.

7. The process of claim 1 wherein substantially no polymers of cyclopentadiene higher than the trimer are produced.

8. The process of claim 1 wherein the hydrocarbon solvent is an aromatic hydrocarbon solvent for tricyclopentadiene.

9. The process of claim 1 wherein the organic solvent is an aliphatic hydrocarbon solvent for dicyclopentadiene.

10. The process of claim 1 wherein the reaction mixture is subjected to hydrogenation and the product recovered is perhydrocyclopentadiene trimer.

11. The process of claim 8 wherein the hydrocarbon solvent is benzene.

12. The process of claim 9 wherein the hydrocarbon solvent is n-heptane or cyclohexane.

References Cited

UNITED STATES PATENTS

| 2,362,227 | 11/1944 | Wells et al. | 260—666 |
| 3,505,402 | 4/1970 | Raff et al. | 260—666 |

OTHER REFERENCES

K. Alder et al.: Liebig Ann. Chem. Bd. 627, p. 47 (footnotes), 1959.

DELBERT E. GANTZ, Primary Examiner

V. O'KEEFE, Assistant Examiner